United States Patent
Deng et al.

(10) Patent No.: US 10,906,840 B2
(45) Date of Patent: Feb. 2, 2021

(54) CELLULOSE NANOCRYSTAL-MODIFIED CERAMIC BLANK AND PREPARATION METHOD THEREOF

(71) Applicant: WUHAN UNIVERSITY OF TECHNOLOGY, Hubei (CN)

(72) Inventors: Tengfei Deng, Hubei (CN); Yanjuan Wang, Hubei (CN); Ning Lin, Hubei (CN); Xiaohong Xu, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 218 days.

(21) Appl. No.: 15/750,178

(22) PCT Filed: Apr. 12, 2017

(86) PCT No.: PCT/CN2017/080186
§ 371 (c)(1),
(2) Date: Feb. 3, 2018

(87) PCT Pub. No.: WO2018/068491
PCT Pub. Date: Apr. 19, 2018

(65) Prior Publication Data
US 2019/0016642 A1 Jan. 17, 2019

(30) Foreign Application Priority Data

Oct. 12, 2016 (CN) .......................... 2016 1 0899422

(51) Int. Cl.
| | |
|---|---|
| C04B 35/636 | (2006.01) |
| C04B 35/626 | (2006.01) |
| C04B 35/634 | (2006.01) |
| C04B 35/14 | (2006.01) |
| C04B 35/632 | (2006.01) |
| C04B 35/185 | (2006.01) |
| C04B 35/486 | (2006.01) |
| C04B 35/583 | (2006.01) |
| C04B 35/111 | (2006.01) |

(52) U.S. Cl.
CPC ........ *C04B 35/6365* (2013.01); *C04B 35/111* (2013.01); *C04B 35/14* (2013.01); *C04B 35/185* (2013.01); *C04B 35/486* (2013.01); *C04B 35/583* (2013.01); *C04B 35/6263* (2013.01); *C04B 35/6269* (2013.01); *C04B 35/62615* (2013.01); *C04B 35/62635* (2013.01); *C04B 35/62655* (2013.01); *C04B 35/62685* (2013.01); *C04B 35/632* (2013.01); *C04B 35/63444* (2013.01); *C04B 2235/3217* (2013.01); *C04B 2235/3244* (2013.01); *C04B 2235/3418* (2013.01); *C04B 2235/3463* (2013.01); *C04B 2235/386* (2013.01); *C04B 2235/448* (2013.01); *C04B 2235/5436* (2013.01); *C04B 2235/5445* (2013.01); *C04B 2235/604* (2013.01); *C04B 2235/606* (2013.01); *C04B 2235/6023* (2013.01); *C04B 2235/61* (2013.01)

(58) Field of Classification Search
CPC ...... C04B 35/62209; C04B 2235/6023; C04B 35/63; C04B 35/632; C04B 35/6365
See application file for complete search history.

(56) References Cited

U.S. PATENT DOCUMENTS

| | | | |
|---|---|---|---|
| 4,894,194 A | 1/1990 | Janney | |
| 5,028,362 A | 7/1991 | Janney et al. | |
| 5,145,908 A * | 9/1992 | Jenny | C03B 19/12 264/109 |
| 5,885,493 A * | 3/1999 | Janney | C04B 35/622 264/232 |
| 6,066,279 A * | 5/2000 | Walls | C04B 35/111 264/109 |
| 6,152,211 A * | 11/2000 | Klug | B22C 1/22 164/361 |
| 6,228,299 B1 * | 5/2001 | Janney | C04B 35/111 264/109 |
| 6,368,525 B1 * | 4/2002 | Klug | B22C 1/00 264/28 |
| 9,370,767 B2 * | 6/2016 | Zhang | H01M 8/065 |
| 10,066,028 B1 * | 9/2018 | Athinarayanan | C08B 1/08 |
| 2003/0180171 A1 * | 9/2003 | Artz | B22F 1/0059 419/2 |
| 2005/0115658 A1 * | 6/2005 | Daga | C04B 35/111 156/89.11 |
| 2013/0178539 A1 * | 7/2013 | Bakeev | B29C 41/003 514/781 |
| 2013/0225732 A1 * | 8/2013 | Bakeev | C09J 101/04 524/44 |
| 2018/0206953 A1 * | 7/2018 | Doviack | C04B 35/6261 |
| 2018/0326613 A1 * | 11/2018 | Enatsu | B28B 11/24 |

FOREIGN PATENT DOCUMENTS

| | | |
|---|---|---|
| CN | 101302110 | 11/2008 |
| CN | 101407411 | 4/2009 |
| CN | 101503298 | 8/2009 |
| CN | 101665360 | 3/2010 |
| CN | 103419268 | * 12/2013 |
| CN | 104053454 | 9/2014 |
| CN | 104909785 | 9/2015 |
| CN | 106495671 | 3/2017 |

* cited by examiner

*Primary Examiner* — Jeffrey M Wollschlager
(74) *Attorney, Agent, or Firm* — JCIPRNET

(57) ABSTRACT

A cellulose nanocrystal-modified ceramic blank and a preparation method thereof are disclosed. Cellulose nanocrystals are added into a ceramic blank in gelcasting. The cellulose nanocrystal-modified ceramic blank comprises, by weight, 0.1 to 10 parts of cellulose nanocrystals, 0.1 to 30 parts of organic gel and 70 to 99 parts of ceramic powder. The cellulose nanocrystal has length of 100 to 300 nm, a diameter of 10 to 20 nm, a slenderness ratio of 10 to 15, and an elastic modulus of 100 to 150 GPa. The drying strength of the ceramic blank with the cellulose nanocrystals is obviously improved.

10 Claims, No Drawings

CELLULOSE NANOCRYSTAL-MODIFIED CERAMIC BLANK AND PREPARATION METHOD THEREOF

CROSS-REFERENCE TO RELATED APPLICATION

This application is a 371 of international application of PCT application serial no. PCT/CN2017/080186, filed on Apr. 12, 2017, which claims the priority benefit of China application no. 201610899422.6, filed on Oct. 12, 2016. The entirety of each of the above-mentioned patent applications is hereby incorporated by reference herein and made a part of this specification.

BACKGROUND

1. Field of the Invention

The present disclosure relates to a technical field of preparing an inorganic non-metallic material, and particularly to a high performance ceramic blank and a preparation method thereof.

2. Description of Related Art

Ceramic material has a relatively high hardness and brittleness, and thus is hard to process in a later stage. As a result, there are few shaping methods for ceramic blank. As to special ceramics with a complex shape and a precise size requirement, the shaping method will become more complicated and hard to operate, which affects quality and yield of ceramic products to a large extent. Gelcasting technology is one kind of near net precise shape forming technology (reference can be made to U.S. Pat. No. 4,894,194 and U.S. Pat. No. 5,028,362) raised by Oak Ridge National Laboratory in early 1990s. In this technology, the polymer chemistry theory and the ceramic casting method are combined, so that an organic monomer, under actions of an initiator and a catalyst, proceeds with polymerization reaction to form a three-dimensional network structure. Then, the ceramic slurry with a high solid content and a low viscosity can be cured and shaped in-situ, and the ceramic blank after drying and shaping has a high strength. The shaping method is simple, and has a low investment. The ceramic blank prepared by this method has a dense structure, an accurate size, and a low organic substance content, and a performance of a product after sintering will not be adversely affected. Acrylamide is a most commonly used organic monomer in gelcasting at present, and can be applied to different ceramic powder systems. The ceramic green body prepared therein has a good performance, and thus acrylamide is widely used at present. However, since acrylamide has a certain neurotoxicity, low toxic and non-toxic gel agents are developed in recent years. It is reported that, the non-toxic gel agents, such as alginate, protein and glucose extracts are used in gelcasting of ceramic materials. Although the gel agents are non-toxic, the ceramic green body prepared thereby has a low mechanical strength. Meanwhile, most of these gel agents need to be extracted from a raw material, and thus a cost thereof is increased. The low toxic gel agents, such as N,N-dimethylacrylamide and N-hydroxymethacrylamide, have properties similar to acrylamide, but a mechanical property of a ceramic green body prepared thereby cannot meet shape requirements of industrial ceramics. Therefore, it is an important technical problem to be solved to improve a strength and a toughness of a ceramic blank prepared by the gelcasting system, which has a profound influence on the development of the ceramic industry.

SUMMARY

The present disclosure provides a gelcasting high performance ceramic blank and a preparation method thereof, whereby a mechanical property of the ceramic blank prepared by different gel agents can be greatly improved. The ceramic blank has a wide using range.

In order to achieve the above purpose, the present disclosure provides a cellulose nanocrystal-modified ceramic blank, wherein cellulose nanocrystals are added into the ceramic blank in gelcasting, and a content of the cellulose nanocrystals is in a range from 0.01 to 15 wt %.

The cellulose nanocrystal-modified ceramic blank comprises, by weight, 0.1 to 10 parts of cellulose nanocrystals, 0.1 to 30 parts of organic gel, and 70 to 99 parts of ceramic powder.

According to this technical solution, the cellulose nanocrystal has a length of 100 to 300 nm, a diameter of 10 to 20 nm, a slenderness ratio of 10 to 15, and an elastic modulus of 100 to 150 GPa.

According to this technical solution, the cellulose nanocrystal is prepared by a method comprising steps of:

subjecting cotton linter to alkali treatment, sulfuric acid hydrolysis, centrifugal cleaning, and dialysis to obtain a cellulose nanocrystal suspension; and freeze-drying the cellulose nanocrystal suspension to obtain cellulose nanocrystal powder.

According to this technical solution, the organic gel is formed by a monomer and a cross-linking agent through polymerization reaction, and contains carbonyl groups on a surface thereof According to this technical solution, the ceramic powder is any one selected from a group consisting of alumina, zirconia, mullite, melted quartz, boron nitride, and any combinations thereof.

The present disclosure further provides a preparation method of the cellulose nanocrystal-modified ceramic blank. The method comprises steps of:

(1) preparing a cellulose nanocrystal-water suspension, adding a monomer, a cross-linking agent, and a dispersant to the suspension in sequence and mixing them uniformly, and adjusting the pH value of the suspension with aqueous ammonia to 8 to 11 so as to obtain a premixed solution;

(2) adding a ceramic powder to the premixed solution and adding grinding balls therein so as to obtain a slurry after ball grinding treatment;

(3) adding an initiator to the slurry, stirring it uniformly, removing bubbles therefrom, pouring the slurry into a mold, and heating and curing the slurry at a temperature of 30 to 80° C. for 20 to 90 min to obtain a semi-product; and (4) taking the semi-product out of the mold, and machining and drying the semi-product so as to obtain a cellulose nanocrystal-modified ceramic blank.

According to this technical solution, in step (2), the ceramic powder is added to the premixed solution in a solid-liquid volume ratio of 1:(0.3-2.4).

According to this technical solution, the monomer is acrylamide, N,N-dimethylacrylamide, N-hydroxymethacrylamide, or macromolecular chitosan; the cross-linking agent is N,N-methylene bisacrylamide; and the dispersant is a polyacrylic compound.

According to this technical solution, a ball grinding time is 30 to 120 min, a rotation speed is 200 to 600 r/min, and a mass ratio of the grinding balls to ceramic powder is (1-3):1.

According to this technical solution, the initiator accounts for 0.1 to 20 wt % of the monomer.

According to this technical solution, the semi-product is first dried at a temperature of 20 to 80° C. for 10 to 24 h, and then dried at a temperature of 80 to 120° C. for 12 to 48 h.

The cellulose nanocrystal is one kind of biomass-based nanoparticle extracted from natural cellulose fiber through acid hydrolysis and other methods. Since the cellulose nanocrystal has wide sources, a high crystallinity, a high elastic modulus, a high strength, and a rod-like shape, and furthermore, it has advantages of bio-material such as light, degradable, biocompatible, and regenerable, the cellulose nanocrystal is suitable to fill a high performance composite material.

The cellulose nanocrystal extracted through sulfuric acid hydrolysis contains lots of negatively charged sulfonic acid groups on a surface thereof, and thus it has a good dispersibility in aqueous solution due to electrostatic repulsion effect. Since the cellulose nanocrystal is a rod-like rigid material, and contains a lot of hydroxyl groups on the surface thereof, and the organic gel contains a lot of carbonyl groups (oxygen-containing functional groups) on the surface thereof, hydrogen bonds can be formed, and interactions can be enhanced. In this manner, the gel network structure becomes more interlaced and more complicated, and thus a mechanical performance of the ceramic blank can be improved.

The present disclosure introduces the cellulose nanocrystal to ceramic system for the first time. The cellulose nanocrystal is dispersed uniformly in ceramic slurry through a water-based gelcasting technology, whereby a toughness of the ceramic blank and a strength thereof after drying can be significantly improved. The method is simple and environmental friendly, and has a low cost. At the same time, the mechanical performance of ceramic blank prepared by different gel systems can be greatly improved. The method has a wide application range, and the brittleness and poor workability of traditional ceramics are changed. Moreover, a using range of the cellulose nanocrystal is widened, and a new method for shaping of the ceramic blank is provided.

Compared with the prior art, the following beneficial effects can be brought about by the present disclosure.

According to the present disclosure, the mechanical performance of gelcasting ceramic blank is improved through adding cellulose nanocrystals for the first time. The cellulose nanocrystal is a rod-like rigid material with a high strength and a high elastic modulus. When the cellulose nanocrystal directly involves in physical doping with an organic gel network structure and a ceramic material, the expansion of microcracks of the ceramic blank can be effectively prevented. A three-point bending strength of the ceramic blank can be improved to 30 MPa (under a condition that the cellulose nanocrystal accounts for 0.45 wt % of the premixed solution), and the ceramic blank can be mechanically processed directly.

Since the cellulose nanocrystal structure contains a large amount of hydroxyl groups, the cellulose nanocrystal has stronger hydrophilicity, so that the water retention of the blank is enhanced. After drying for 1 to 3 hours, a three-point bending deformation of a gel blank (75 mm×11 mm×6 mm) can be improved to 10.8 mm. The toughness of the gel blank can be obviously improved and the gel blank has certain bending strength, so that the difficult problem that the gel blank easily adheres to a mold in a punching process can be solved. The preparation method can directly shape the gel blank and greatly simplifies the industrial production process.

The extraction technology of the cellulose nanocrystal is mature. The cellulose nanocrystal has abundant raw material sources, is natural and non-toxic, and is a regenerative resource. The cellulose nanocrystal is used in the ceramic field for the first time, which endows the ceramic products with good performances. The added value of the ceramic products can be improved, and the using range thereof can be further widened. The present disclosure provides a new method for improving the mechanical property of gelcasting ceramic blank, and the method can be promoted in the industry for wide application.

DESCRIPTION OF THE EMBODIMENTS

The technical solutions of the present disclosure will be further illustrated hereinafter with reference to specific embodiments. However, the specific embodiments disclosed herein shall not be considered as a limitation to the scope of the present disclosure.

A cellulose nanocrystal is prepared by the following method.

Cotton linter is treated by alkali to remove impurities, lignin, hemicellulose and other components. Purified cotton linter cellulose proceeds with strong acid hydrolysis by sulfuric acid aqueous solution (with a mass percentage of 65%) to remove an amorphous zone from the cellulose and remain a rigid crystalline zone therein. The hydrolysis time is 1 hour. The cellulose nanocrystal suspension after hydrolysis is centrifugal cleaned for 3 to 5 times by deionized water. After deionized water dialysis, a cellulose nanocrystal suspension is obtained, and cellulose nanocrystal powder is obtained after freezing and drying.

The cellulose nanocrystal prepared therein has a rod-like shape, and has a length of 100 to 300 nm, a diameter of 10 to 20 nm, a slenderness ratio of 10 to 15, and an elastic modulus of 100 to 150 GPa.

Example 1

(1) 3.75 g cellulose nanocrystal suspension (with a mass percentage of 1.5%) is weighed accurately, and N,N-dimethylacrylamide (3.75 g), N,N-methylene bisacrylamide (0.075 g), and ammonium polyacrylate (0.3 g) are added to the suspension in sequence. After stirring for 10 min, a pH value of the suspension is adjusted to 9.3 with aqueous ammonia, and a premixed solution is obtained.

(2) Alumina powder (ball-shaped $\alpha\text{-}Al_2O_3$, white powder, d50≈5 μm, $\alpha\text{-}Al_2O_3$ content >99.8%) and the premixed solution are mixed with a solid-liquid volume ratio being 1:1. Grinding balls are added therein with a mass ratio of grinding balls to ceramic powder being 1.5:1, ball grinding for 30 min with a rotation speed of 500 rpm, and a slurry is obtained.

(3) An initiator ammonium persulfate (0.0375 g) is added to the slurry. The slurry is stirred for 15 min, and bubbles are removed therefrom in vacuum. The slurry is then poured into a mold, and heated and cured at a temperature of 70° C.

(4) After being cured, wet blank is taken out of the mold, machined, dried at a temperature of 40° C. for 12 h, and dried in vacuum at a temperature of 90° C. for 24 h to obtain a ceramic blank with a high strength.

Comparative Example 1

3.75 g water is weighed accurately to substitute the cellulose nanocrystal suspension in Example 1, and other steps are the same as those in Example 1. Another ceramic blank is prepared.

It is shown that, a bending strength of the dried cellulose nanocrystal-modified ceramic blank in Example 1 is 30.19 MPa, which is increased by 51% compared with the ceramic blank in Comparative example 1. Meanwhile, a three-point bending deformation of the cellulose nanocrystal-modified ceramic blank in Example 1 after dried for 2 hours in a natural environment is 3 mm, which is increased by 71% compared with the ceramic blank in Comparative example 1 under a same condition.

Example 2

(1) 15 g cellulose nanocrystal suspension (with a mass percentage of 1.5%) is weighed accurately, and distilled water (25 g) is added to the suspension to obtain a cellulose nanocrystal-water solution. The solution is stirred for 10 min, and N,N-dimethylacrylamide (7.5 g), N,N-methylene bisacrylamide (0.15 g), and ammonium polyacrylate (0.6 g) are added to the solution in sequence. After stirring for 10 min, a pH value of the suspension is adjusted to 9 with aqueous ammonia, and a premixed solution is obtained.

(2) Alumina powder (ball-shaped $\alpha$-$Al_2O_3$, white powder, d50≈5 μm, $\alpha$-$Al_2O_3$ content >99.8%) and the premixed solution are mixed with a solid-liquid volume ratio being 1:1. Grinding balls are added therein with a mass ratio of grinding balls to ceramic powder being 1.5:1, ball grinding for 30 min with a rotation speed of 400 rpm, and a slurry is obtained.

(3) An initiator ammonium persulfate (0.075 g) is added to the slurry. The slurry is stirred for 15 min, and bubbles are removed therefrom in vacuum. The slurry is then poured into a mold, and heated and cured at a temperature of 70° C.

(4) After being cured, wet blank is taken out of the mold, machined, dried at a temperature of 40° C. for 12 h, and dried in vacuum at a temperature of 90° C. for 24 h to obtain a ceramic blank with a high strength.

Comparative Example 2

15 g water is weighed accurately to substitute the cellulose nanocrystal suspension in Example 2, and other steps are the same as those in Example 2. Another ceramic blank is prepared.

It is shown that, a bending strength of the dried cellulose nanocrystal-modified ceramic blank in Example 2 is 30.9 MPa, which is increased by 55% compared with the ceramic blank in Comparative example 2. Meanwhile, a three-point bending deformation of the cellulose nanocrystal-modified ceramic blank in Example 2 after dried for 2 hours in a natural environment is 2.5 mm, which is increased by 43% compared with the ceramic blank in Comparative example 2 under a same condition.

Example 3

(1) 30 g cellulose nanocrystal suspension (with a mass percentage of 1.5%) is weighed accurately, and distilled water (10 g) is added to the suspension to obtain a cellulose nanocrystal-water solution. The solution is stirred for 10 min, and N,N-dimethylacrylamide (7.5 g), N,N-methylene bisacrylamide (0.15 g), and ammonium polyacrylate (0.6 g) are added to the solution in sequence. After stirring for 10 min, a pH value of the suspension is adjusted to 9.2 with aqueous ammonia, and a premixed solution is obtained.

(2) Alumina powder (ball-shaped $\alpha$-$Al_2O_3$, white powder, d50≈5 μm, $\alpha$-$Al_2O_3$ content >99.8%) and the premixed solution are mixed with a solid-liquid volume ratio being 1:1. Grinding balls are added therein with a mass ratio of grinding balls to ceramic powder being 1.5:1, ball grinding for 30 min with a rotation speed of 400 rpm, and a slurry is obtained.

(3) An initiator ammonium persulfate (0.075 g) is added to the slurry. The slurry is stirred for 15 min, and bubbles are removed therefrom in vacuum. The slurry is then poured into a mold, and heated and cured at a temperature of 70° C.

(4) After being cured, wet blank is taken out of the mold, machined, dried at a temperature of 40° C. for 12 h, and dried in vacuum at a temperature of 90° C. for 24 h to obtain a ceramic blank with a high strength.

Comparative Example 3

Water 30 g is weighed accurately to substitute the cellulose nanocrystal suspension in Example 3, and other steps are the same as those in Example 3. Another ceramic blank is prepared.

It is shown that, a bending strength of the dried cellulose nanocrystal-modified ceramic blank in Example 3 is 24.7 MPa, which is increased by 25% compared with the ceramic blank in Comparative example 3. Meanwhile, a three-point bending deformation of the cellulose nanocrystal-modified ceramic blank in Example 3 after dried for 2 hours in a natural environment is 2.9 mm, which is increased by 66% compared with the ceramic blank in Comparative example 3 under a same condition.

Example 4

(1) 40 g cellulose nanocrystal suspension (with a mass percentage of 1.5%) is weighed accurately, and N,N-dimethylacrylamide (7.5 g), N,N-methylene bisacrylamide (0.15 g), and ammonium polyacrylate (0.6 g) are added to the suspension in sequence.

After stirring for 10 min, a pH value of the suspension is adjusted to 9.4 with aqueous ammonia, and a premixed solution is obtained.

(2) Alumina powder (ball-shaped $\alpha$-$Al_2O_3$, white powder, d50≈5 μm, $\alpha$-$Al_2O_3$ content >99.8%) and the premixed solution are mixed with a solid-liquid volume ratio being 1:1. Grinding balls are added therein with a mass ratio of grinding balls to ceramic powder being 1.5: 1, ball grinding for 30 min with a rotation speed of 400 rpm, and a slurry is obtained.

(3) An initiator ammonium persulfate (0.075 g) is added to the slurry. The slurry is stirred for 15 min, and bubbles are removed therefrom in vacuum for 10 min.

The slurry is then poured into a mold, and heated and cured at a temperature of 70° C. for 60 min.

(4) After being cured, wet blank is taken out of the mold, machined, dried at a temperature of 40° C. for 12 h, and dried in vacuum at a temperature of 90° C. for 24 h to obtain a ceramic blank with a high strength.

Comparative Example 4

40 g water is weighed accurately to substitute the cellulose nanocrystal suspension in Example 4, and other steps are the same as those in Example 4. Another ceramic blank is prepared.

It is shown that, a bending strength of the dried cellulose nanocrystal-modified ceramic blank in Example 4 is 27.8 MPa, which is increased by 39% compared with the ceramic blank in Comparative example 4. Meanwhile, a three-point bending deformation of the cellulose nanocrystal-modified ceramic blank in Example 4 after dried for 2 hours in a natural environment is 3.9 mm, which is increased by 124% compared with the ceramic blank in Comparative example 4 under a same condition.

Example 5

(1) 10 g cellulose nanocrystal suspension (with a mass percentage of 2%) is weighed accurately, and distilled water (30 g) is added to the suspension to obtain a cellulose nanocrystal-water solution. The solution is stirred for 10 min, and acrylamide (7.5 g), N,N-methylene bisacrylamide (0.15 g), and ammonium polyacrylate (0.6 g) are added to the solution in sequence. After stirring for 10 min, a pH value of the suspension is adjusted to 9 with aqueous ammonia, and a premixed solution is obtained.

(2) Alumina powder (ball-shaped $\alpha$-$Al_2O_3$, white powder, d50≈5 μm, $\alpha$-$Al_2O_3$ content >99.8%) and the premixed solution are mixed with a solid-liquid volume ratio being 1:1. Grinding balls are added therein with a mass ratio of grinding balls to ceramic powder being 1.5:1, ball grinding for 30 min with a rotation speed of 400 rpm, and a slurry is obtained.

(3) An initiator ammonium persulfate (0.075 g) is added to the slurry. The slurry is stirred for 15 min, and bubbles are removed therefrom in vacuum. The slurry is then poured into a mold, and heated and cured at a temperature of 70° C.

(4) After being cured, wet blank is taken out of the mold, machined, dried at a temperature of 40° C. for 12 h, and dried in vacuum at a temperature of 90° C. for 24 h to obtain a ceramic blank with a high strength.

Comparative Example 5

10 g water is weighed accurately to substitute the cellulose nanocrystal suspension in Example 5, and other steps are the same as those in Example 5. Another ceramic blank is prepared.

It is shown that, a drying strength of the ceramic blank prepared by the acrylamide gelcasting system in Comparative example 5 is 46.62 MPa, while a bending strength of the dried cellulose nanocrystal-modified ceramic blank in Example 5 is 58.85 MPa, which is increased by 26.2% compared with the ceramic blank in Comparative example 5. Meanwhile, a three-point bending deformation of the cellulose nanocrystal-modified ceramic blank in Example 5 after dried for 2 hours in a natural environment is 3.1 mm, which is increased by 77% compared with the ceramic blank in Comparative example 5 under a same condition.

According to the present disclosure, the mechanical properties of the cellulose nanocrystal-modified water-based gelcasting ceramic blank can be significantly improved, and the ceramic blank prepared therein is easy to process. The mechanical properties of the ceramic blank in other examples are all better than those in corresponding comparative examples, and they will not be illustrated in detail here.

The technical effect of the present disclosure can be realized by all raw materials, upper limit, lower limit, and values therebetween of the raw materials, as well as upper limit, lower limit, and values therebetween of process parameters, such as the drying temperature, the rotation speed, and so on. The examples are described in an exemplary manner rather than an exhaustive manner.

What is claimed is:

1. A method of preparing a ceramic blank, comprising:
   (1) preparing a cellulose nanocrystal-water suspension wherein a mass percentage of cellulose nanocrystals in the cellulose nanocrystal-water suspension is 0.01-15 wt %, and a preparation method of the cellulose nanocrystal-water suspension comprises subjecting cotton linter to alkali treatment, sulfuric acid hydrolysis, centrifugal cleaning, and dialysis, wherein the cellulose nanocrystal has a length of 100-300 nm, a diameter of 10-20 nm, a slenderness ratio of 10-15, and an elastic modulus of 100-150 GPa; adding a monomer, a cross-linking agent, and a dispersant to the suspension in sequence and mixing them uniformly; and adjusting a pH value of the suspension with aqueous ammonia to 8-11 to obtain a premixed solution;
   (2) adding a ceramic powder to the premixed solution; and adding grinding balls therein to obtain a slurry after ball grinding treatment;
   (3) adding an initiator to the slurry; stirring the slurry uniformly; removing bubbles therefrom; pouring the slurry into a mold; and heating and curing the slurry at a temperature of 30-80° C. for 20-90 min to obtain a semi-product; and
   (4) taking the semi-product out of the mold; and machining and drying the semi-product to obtain a cellulose nanocrystal-modified ceramic blank.

2. The method of claim 1, wherein the ceramic powder is added to the premixed solution in a solid-liquid volume ratio of 1:0.3 to 1:2.4 in step (2).

3. The method of claim 1, wherein
   the monomer is acrylamide, N,N-dimethylacrylamide, N-hydroxymethacrylamide, or macromolecular chitosan;
   the cross-linking agent is N,N-methylene bisacrylamide; and
   the dispersant is a polyacrylic compound.

4. The method of claim 1, wherein the ball grinding treatment is performed for 30-120 minutes at a rotation speed of 200-600 rpm, and a mass ratio of the grinding balls to the ceramic powder is 1:1 to 3:1.

5. The method of claim 1, wherein the semi-product is first dried at a temperature of 20-80° C. for 10-24 hours, and then dried at a temperature of 80-120° C. for 12-48 hours.

6. A method of preparing a ceramic blank, comprising:
   (1) preparing a cellulose nanocrystal-water suspension, wherein a preparation method of the cellulose nanocrystal-water suspension comprises subjecting cotton linter to alkali treatment, sulfuric acid hydrolysis, centrifugal cleaning, and dialysis, wherein the cellulose nanocrystal has a length of 100-300 nm, a diameter of 10-20 nm, a slenderness ratio of 10-15, and an elastic modulus of 100-150 GPa; adding a monomer, a cross-linking agent, and a dispersant to the suspension in sequence and mixing them unifonnly; and adjusting a pH value of the suspension with aqueous ammonia to 8-11 to obtain a premixed solution;
   (2) adding a ceramic powder to the premixed solution; and adding grinding balls therein to obtain a slurry after ball grinding treatment;
   (3) adding an initiator to the slurry; stirring the slurry unifonnly; removing bubbles therefrom; pouring the slurry into a mold; and heating and curing the slurry at a temperature of 30-80° C. for 20-90 min to obtain a semi-product; and (4) taking the semi-product out of the mold; and machining and drying the semi-product to obtain a cellulose nanocrystal-modified ceramic blank, wherein the cellulose nanocrystal-modified ceramic blank comprises:
0.1-10 parts by weight of cellulose nanocrystals;
0.1-30 parts by weight of acrylamide compound; and
70-99 parts by weight of ceramic powder.

7. The method of claim 6, wherein the ceramic powder is added to the premixed solution in a solid-liquid volume ratio of 1:0.3 to 1:2.4 in step (2).

8. The method of claim 6, wherein the monomer is acrylamide, N,N-dimethylacrylamide, N-hydroxymethacrylamide, or macromolecular chitosan;
the cross-linking agent is N,N-methylene bisacrylamide; and
the dispersant is a polyacrylic compound.

9. The method of claim 6, wherein the ball grinding treatment is performed for 30-120 minutes at a rotation speed of 200-600 rpm, and a mass ratio of the grinding balls to the ceramic powder is 1:1 to 3:1.

10. The method of claim 6, wherein the semi-product is first dried at a temperature of 20-80° C. for 10-24 hours, and then dried at a temperature of 80-120° C. for 12-48 hours.

\* \* \* \* \*